(12) United States Patent
Cepic et al.

(10) Patent No.: US 11,905,033 B2
(45) Date of Patent: Feb. 20, 2024

(54) HARD-LANDING DETECTION SYSTEM (71) Applicant: GOODRICH CORPORATION, Charlotte, NC (US)

(72) Inventors: Adnan Cepic, Mississauga (CA); Ebenezer Kielstra, Beamsville (CA); Amir Fazeli, Mississauga (CA)

(73) Assignee: GOODRICH CORPORATION, Charlotte, NC (US)

( * ) Notice: Subject to any disclaimer, the term of this patent is extended or adjusted under 35 U.S.C. 154(b) by 441 days.

(21) Appl. No.: 17/127,348

(22) Filed: Dec. 18, 2020

(65) Prior Publication Data
US 2022/0194624 A1 Jun. 23, 2022

(51) Int. Cl.
  *B64D 45/00* (2006.01)
  *B64C 25/60* (2006.01)
  *G01D 21/02* (2006.01)

(52) U.S. Cl.
  CPC .......... *B64D 45/0005* (2013.01); *B64C 25/60* (2013.01); *G01D 21/02* (2013.01); *B64D 2045/008* (2013.01)

(58) Field of Classification Search
  CPC .......... B64D 45/0005; B64D 2045/008; B64C 25/60; B64C 25/28; G01D 21/02
  See application file for complete search history.

(56) References Cited

U.S. PATENT DOCUMENTS

| | | | |
|---|---|---|---|
| 6,676,075 B2 | 1/2004 | Cowan et al. | |
| 7,589,645 B2 | 9/2009 | Schmidt | |
| 7,946,165 B2 | 5/2011 | Cahill | |
| 8,055,396 B2 | 11/2011 | Yates et al. | |
| 8,700,235 B2 | 4/2014 | Lastere et al. | |
| 9,798,838 B2 | 10/2017 | Collett et al. | |
| 10,112,702 B2 | 10/2018 | Cepic et al. | |
| 2010/0281967 A1* | 11/2010 | Cahill | B64D 45/00 73/146 |

(Continued)

FOREIGN PATENT DOCUMENTS

| EP | 3044054 | 5/2020 |
|---|---|---|
| KR | 20130014036 A * | 7/2012 |

OTHER PUBLICATIONS

European Patent Office, European Search Report dated May 9, 2022 in Application No. 21214871.2.

(Continued)

*Primary Examiner* — James M Mcpherson
*Assistant Examiner* — Kyle J Kingsland
(74) *Attorney, Agent, or Firm* — SNELL & WILMER L.L.P.

(57) ABSTRACT

A method of determining whether a landing event of an aircraft is hard may comprise: receiving, by a controller via a stroke position sensor, a stroke profile as a function of time for a shock strut; receiving, by the controller via a gas pressure sensor, a gas pressure in a gas chamber of the shock strut; receiving, by the controller via a wheel speed sensor, a wheel speed of a tire in a landing gear assembly; calculating, by the controller, multiple time dependent functions based on the stroke profile of the shock strut, based on the gas pressure, a shock strut temperature, and the wheel speed; and comparing, by the controller, the multiple time dependent functions to respective predetermined thresholds to determine whether the landing event is hard.

20 Claims, 7 Drawing Sheets

(56) References Cited

U.S. PATENT DOCUMENTS

| | | |
|---|---|---|
| 2011/0154907 A1 | 6/2011 | Kyle et al. |
| 2014/0107990 A1 | 4/2014 | Laura et al. |
| 2017/0283085 A1 | 10/2017 | Kearns et al. |
| 2017/0291722 A1 | 10/2017 | Owens et al. |
| 2018/0170531 A1 | 6/2018 | Valerijan et al. |
| 2018/0222575 A1* | 8/2018 | Cepic ............... B64D 45/00 |
| 2018/0339767 A1* | 11/2018 | Cox ............... B64C 25/405 |
| 2019/0031323 A1 | 1/2019 | Baird |

OTHER PUBLICATIONS

European Patent Office, European Office Action dated Oct. 23, 2023 in Application No. 21214871.2.

* cited by examiner

HARD-LANDING DETECTION SYSTEM

FIELD

The present disclosure relates to aircraft systems, and more specifically, to landing systems.

BACKGROUND

Shock absorbing devices are used in a wide variety of vehicle suspension systems for controlling motion of the vehicle and its tires with respect to the ground and for reducing transmission of transient forces from the ground to the vehicle. Shock absorbing struts are a common component in most aircraft landing gear assemblies. The shock struts used in the landing gear of aircraft generally are subject to more demanding performance requirements than many ground vehicle shock absorbers. In particular, shock struts control motion of the landing gear, and absorb and damp loads imposed on the gear during landing, taxiing and takeoff, and during braking.

A shock strut generally accomplishes these functions by compressing a fluid within a sealed chamber formed by hollow telescoping cylinders. The fluid generally includes both a gas and a liquid, such as hydraulic fluid or oil. One type of shock strut generally utilizes an "air-over-oil" arrangement wherein a trapped volume of gas is compressed as the shock strut is axially compressed, and a volume of oil is metered through an orifice. The gas acts as an energy storage device, such as a spring, so that upon termination of a compressing force the shock strut returns to its original length. Shock struts also dissipate energy by passing the oil through the orifice so that as the shock absorber is compressed or extended, its rate of motion is limited by the damping action from the interaction of the orifice and the oil.

While shock struts may effectively absorb energy during aircraft landing events, "hard-landing events" may result in structural damage to the aircraft and/or landing gear assemblies. A landing event is conventionally deemed "hard" (i.e., a hard-landing event) when the pilot declares the landing event to be such. In other words, there is a level of subjectivity in determining whether a landing event is a hard-landing. There are various problems with this method of subjectively. For example, if the pilot declares a hard-landing event, the aircraft must be inspected, tested, and/or analytically reviewed with landing data to verify that the aircraft structures and/or landing gear assemblies were not overloaded. The inspection process and/or analytical review process generally results in the aircraft being out of commission for a period of time and involves the expenditure of time and resources. Often the inspection process results in no structural damage found. Alternatively, if a hard-landing event occurs without the pilot identifying/declaring it as such, structural damage may go unnoticed. For at least these reasons, conventional solutions for detection of hard landings often do not produce reliable results.

SUMMARY

A hard-landing detection system of an aircraft is disclosed herein. The system may comprise: a landing gear assembly comprising: a wheel assembly having a wheel, a shock strut mechanically coupled to the wheel assembly, a stroke position sensor coupled to the shock strut, a gas pressure sensor coupled to the shock strut, a wheel speed sensor configured to determine a wheel speed of the wheel; a temperature sensor configured to determine a temperature of the shock strut; a controller having a processor; and a tangible, non-transitory memory configured to communicate with the processor, the tangible, non-transitory memory having instructions stored thereon that, in response to execution by the processor, cause the hard-landing detection system to perform operations comprising: detecting, by the processor, a landing event; performing, by the processor, calculations based on time dependent measurements, the time dependent measurements comprising a stroke profile of the shock strut from the stroke position sensor, a gas pressure from the gas pressure sensor, and the wheel speed from the wheel speed sensor; comparing, by the processor, a maximum vertical load, a maximum axle drag load, and a minimum axle drag load to predetermined envelope for vertical loads and axle drag loads; and determining, by the processor, whether the landing event is hard based on the comparison.

In various embodiments, detecting the landing event comprises using the wheel speed sensor to measure an applied torque to a tire. In various embodiments, determining whether the landing event is hard comprises comparing, by the processor, an axle drag load to a predetermined maximum axle drag load for a corresponding vertical load. Determining whether the landing event is hard may comprise: calculating, by the processor, an applied torque based on an acceleration of the wheel, an inertia of a rotating mass, and an unloaded tire radius; calculating, by the processor, a total torque based on the applied torque, a shock strut vertical load, and a bearing friction coefficient; calculating, by the processor, a tire drag force based on the total torque and a loaded tire radius; calculating, by the processor an axle drag force based on the tire drag force; and comparing, by the processor, the axle drag force to a predetermined maximum axle drag load for a corresponding vertical load. The operations may further comprise comparing, by the processor, the axle drag force to a predetermined minimum axle drag load. Determining whether the landing event is hard may further comprise: calculating, by the processor, a vertical load on a landing gear structure based on the stroke profile, the gas pressure, an oil pressure, and a recoil pressure; and comparing, by the processor, the vertical load to a predetermined maximum vertical load. Determining whether the landing event is hard may further comprises determining, by the processor, the landing event is hard in response to one of the following being true: the vertical load exceeding the predetermined maximum vertical load for a corresponding axle drag load; the axle drag force exceeding the predetermined maximum axle drag load for a first corresponding vertical load; or the axle drag force being below a predetermined minimum axle drag load for a second corresponding vertical load.

A method of determining whether a landing event of an aircraft is hard is disclosed herein. The method may comprise: receiving, by a controller via a stroke position sensor, a stroke profile as a function of time for a shock strut; receiving, by the controller via a gas pressure sensor, a gas pressure in a gas chamber of the shock strut; receiving, by the controller via a wheel speed sensor, a wheel speed of a tire in a landing gear assembly; receiving, by the controller via a temperature sensor, one of a gas temperature, an oil temperature, or a shock strut temperature of the shock strut in the landing gear assembly; calculating, by the controller, multiple time dependent functions based on the stroke profile of the shock strut, based on the gas pressure, and based on the wheel speed; and comparing, by the controller, the multiple time dependent functions to respective predetermined envelope for axle drag loads and vertical loads to determine whether the landing event is hard.

The method may further comprise comparing, by the controller, an axle drag load to a predetermined maximum axle drag load for a first corresponding vertical load. The method may further comprise comparing, by the controller, an axle drag load to a predetermined minimum axle drag load for a second corresponding vertical load. The method may further comprise comparing, by the controller, a vertical load of a landing gear structure to a predetermined maximum vertical load for a corresponding axle drag load. The method may further comprise determining, by the controller, the landing event is hard in response to one of the vertical load exceeding the predetermined maximum vertical load for the corresponding axle drag load, the axle drag load exceeding the predetermined maximum axle drag load for the first corresponding vertical load, or the axle drag load being less than the predetermined minimum axle drag load for the second corresponding vertical load. The method may further comprise: calculating, by the controller, an applied torque based on an acceleration of the tire, an inertia of a rotating mass, and an unloaded tire radius; calculating, by the controller, a total torque based on the applied torque, a shock strut vertical load, and a bearing friction coefficient; calculating, by the controller, a tire drag force based on the total torque and a loaded tire radius; calculating, by the controller, a vertical load on a landing gear structure based on the stroke profile, the gas pressure, and the gas temperature; calculating, by the controller an axle drag force based on the tire drag force; and comparing, by the controller, the axle drag force and the vertical load to a predetermined envelope of axle drag loads and vertical loads. The method may further comprise comparing, by the controller, the axle drag force to a predetermined minimum axle drag load.

An article of manufacture is disclosed herein. The article of manufacture may include a tangible, non-transitory computer-readable storage medium having instructions stored thereon that, in response to execution by a processor, cause the processor to perform operations comprising: receiving, via the processor, a stroke profile as a function of time for a shock strut; receiving, via the processor, a gas pressure measurement in a gas chamber of the shock strut; receiving, via the processor, a wheel speed measurement of a tire in a landing gear assembly; receiving, via the processor, a gas temperature measurement of the shock strut; calculating, by the processor, a vertical load on a landing gear structure based on the stroke profile, the gas pressure measurement, and the gas temperature measurement; calculating, via the processor, an axle drag load as a function of time based on the stroke profile of the shock strut, based on the gas pressure measurement, and based on the wheel speed measurement; and comparing, via the processor, the axle drag load as a function of time and the vertical load as a function of time to a predetermined envelope of axle drag loads and vertical loads to determine whether a landing event is hard.

In various embodiments, the operations may further comprise comparing, via the processor, the axle drag load as a function of time to a predetermined axle drag load minimum threshold to determine whether the landing event is hard. The operations may further comprise determining, via the processor, the landing event is hard in response to one of the axle drag load exceeding a predetermined axle drag load maximum threshold for a first corresponding vertical load and the axle drag load being less than the predetermined axle drag load minimum threshold for a second corresponding vertical load. The operations may further comprise: calculating, via the processor, an applied torque based on an acceleration of the tire, an inertia of a rotating mass, and an unloaded tire radius; calculating, via the processor, a total torque based on the applied torque, a shock strut vertical load, and a bearing friction coefficient; calculating, via the processor, a tire drag force based on the total torque and a loaded tire radius; calculating, via the processor an axle drag force based on the tire drag force; and comparing, via the processor, the axle drag force to a predetermined maximum axle drag load. The operations may further comprise comparing, by the processor, the axle drag force to a predetermined minimum axle drag load. The operations may further comprise: calculating, by the processor, the vertical load on the landing gear structure based on the stroke profile, a gas pressure, an oil pressure, a gas temperature, and a recoil pressure; and comparing, by the processor, the vertical load to a predetermined maximum vertical load for a corresponding axle drag load.

The forgoing features and elements may be combined in various combinations without exclusivity, unless expressly indicated herein otherwise. These features and elements as well as the operation of the disclosed embodiments will become more apparent in light of the following description and accompanying drawings.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

As used herein, "aft" refers to the direction associated with the tail (e.g., the back end) of an aircraft. As used herein, "forward" refers to the direction associated with the nose (e.g., the front end) of an aircraft, or generally, to the direction of flight or motion.

Figure 1:
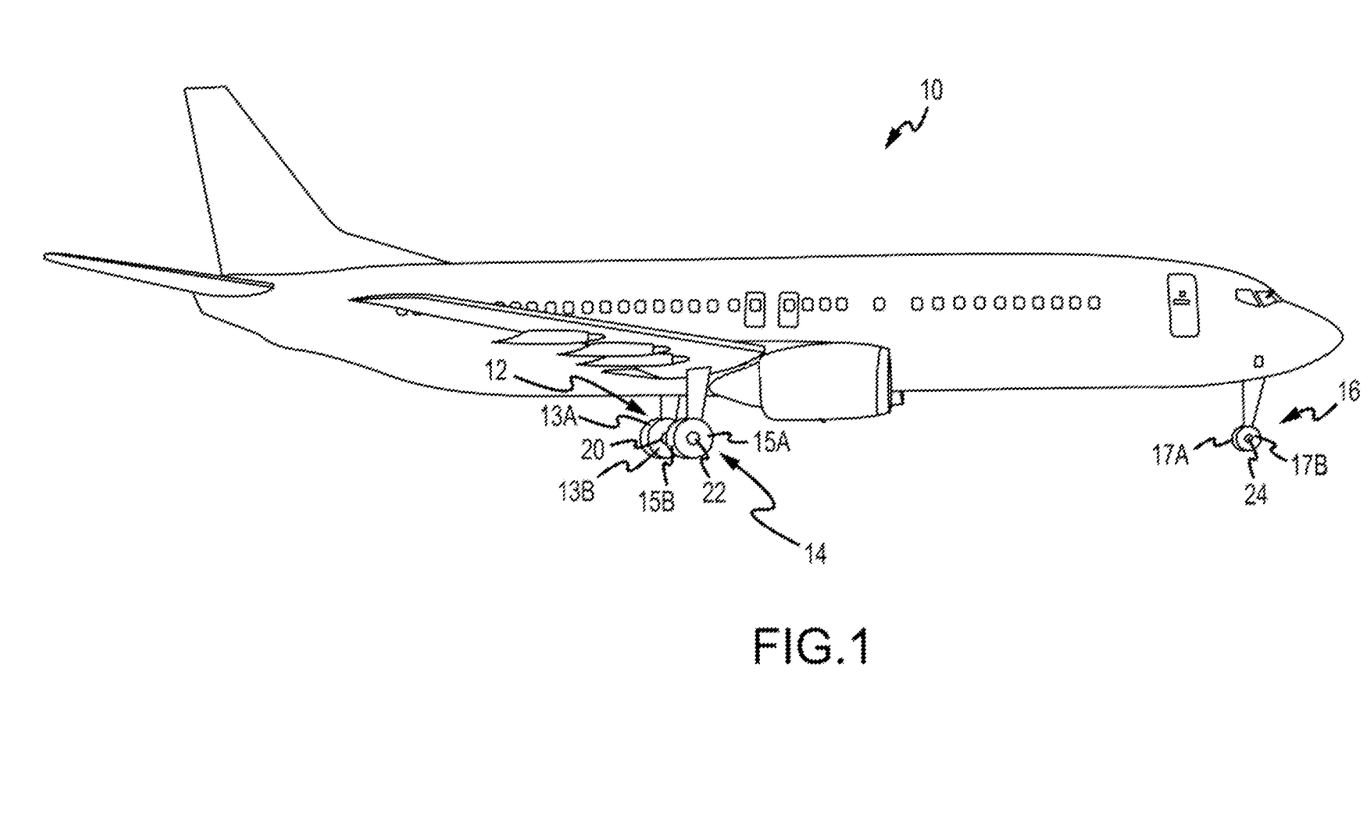
FIG. 1 illustrates an exemplary aircraft having landing gear, in accordance with various embodiments.

Referring now to FIG. 1, in accordance with various embodiments, an aircraft 10 may include landing gear such as main landing gear 12, main landing gear 14 and nose landing gear 16. Main landing gear 12, main landing gear 14, and nose landing gear 16 may generally support aircraft 10 when aircraft 10 is not flying, allowing aircraft 10 to taxi, take off, land, and brake without damage. Main landing gear 12 may include wheel 13A and wheel 13B coupled by an axle 20. Main landing gear 14 may include wheel 15A and wheel 15B coupled by an axle 22. Nose landing gear 16 may include nose wheel 17A and nose wheel 17B coupled by an axle 24. In various embodiments, aircraft 10 may comprise any number of landing gears and each landing gear may comprise any number of wheels. Main landing gear 12, main landing gear 14, and nose landing gear 16 may each be retracted for flight.

Aircraft landing gears 12, 14, 16, in accordance with the present disclosure, may include a shock strut. In various embodiments, and with reference to FIG. 2, a landing gear assembly 100 is illustrated. The landing gear assembly 100 may be implemented as one of the landing gears 12, 14, 16 described above with reference to FIG. 1. The landing gear assembly 100 includes a shock strut 104. Shock strut 104 may be mechanically coupled to a wheel assembly 106 and to landing gear structure 90. In various embodiments, shock strut 104 may be configured to absorb and dampen forces transmitted by wheel assembly 106 to an aircraft.

Figure 2:
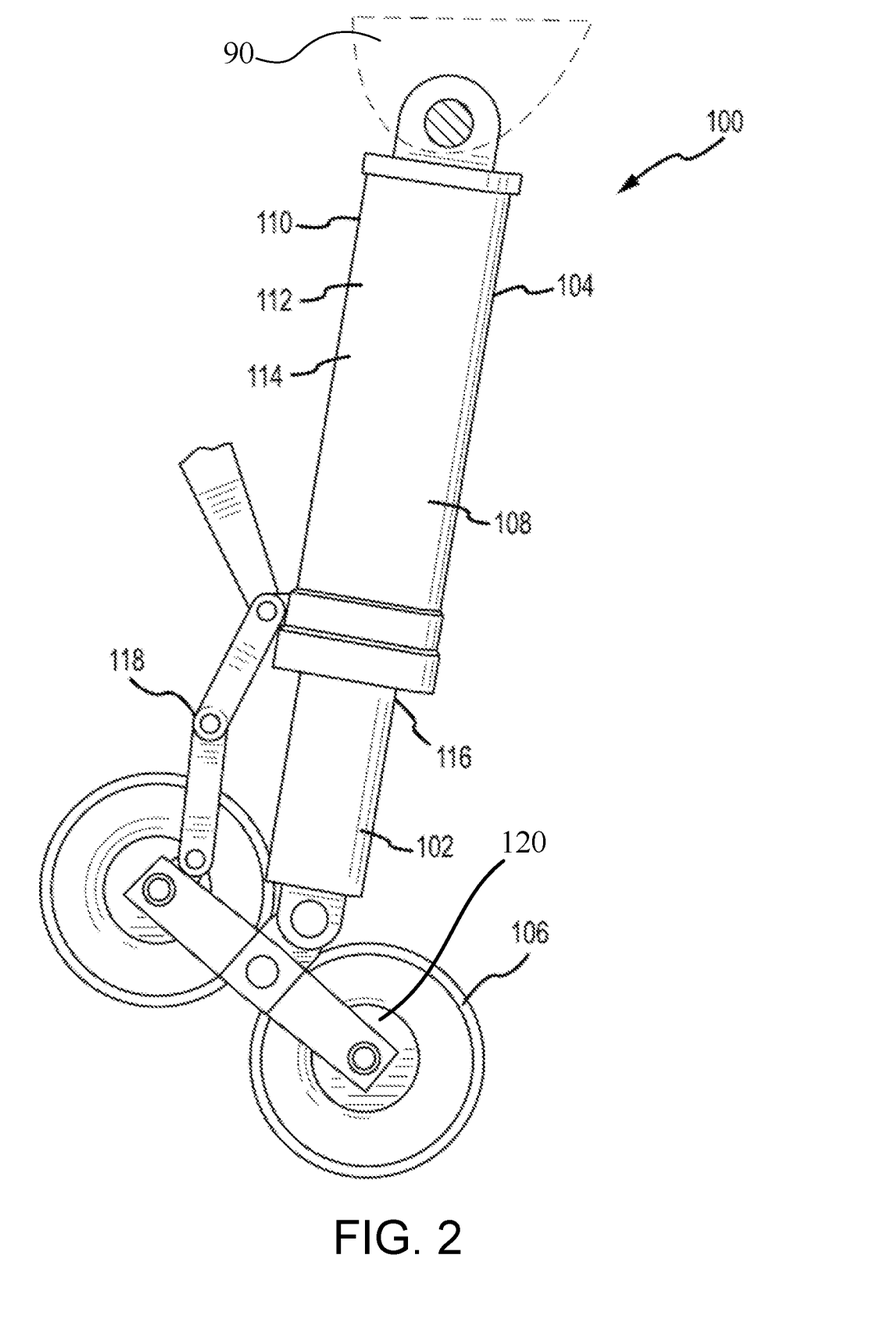
FIG. 2 illustrates a schematic of a shock strut for use in landing gear assemblies of an aircraft, in accordance with various embodiments.

Shock strut 104 may comprise, for example, a piston 102 and a cylinder 108. Cylinder 108 may be configured to receive piston 102 in a manner that allows the two components to telescope together and absorb and dampen forces transmitted by wheel assembly 106. In various embodiments, a liquid, such as a hydraulic fluid or oil, is located within cylinder 108. Cylinder 108 and piston 102 may, for example, be configured to seal such that liquid contained within cylinder 108 is prevented from leaking as piston 102 translates relative to cylinder 108. Further, cylinder 108 may be configured to contain a gas such as nitrogen gas or air. Shock strut 104 may comprise a proximal end and a distal end, wherein the distal end is opposite the proximal end, the distal end being the end of the shock strut closest to a wheel or wheel assembly of a vehicle, such as wheel assembly 106, for example. A gas chamber may be positioned above an oil chamber (referred to as an "air-over-oil" arrangement) or vice versa, where the term "above" in this context means in the direction of the proximal end of the shock strut. The shock strut 104 may further include a recoil chamber having an orifice support through which the recoil chamber is fluidly connected to the oil chamber. Similarly, cylinder 108 and piston 102 may be sealed such that gas is prevented from leaking as piston 102 moves relative to cylinder 108. As such, shock strut 104 may comprise a pressurized environment within cylinder 108.

Figure 3:
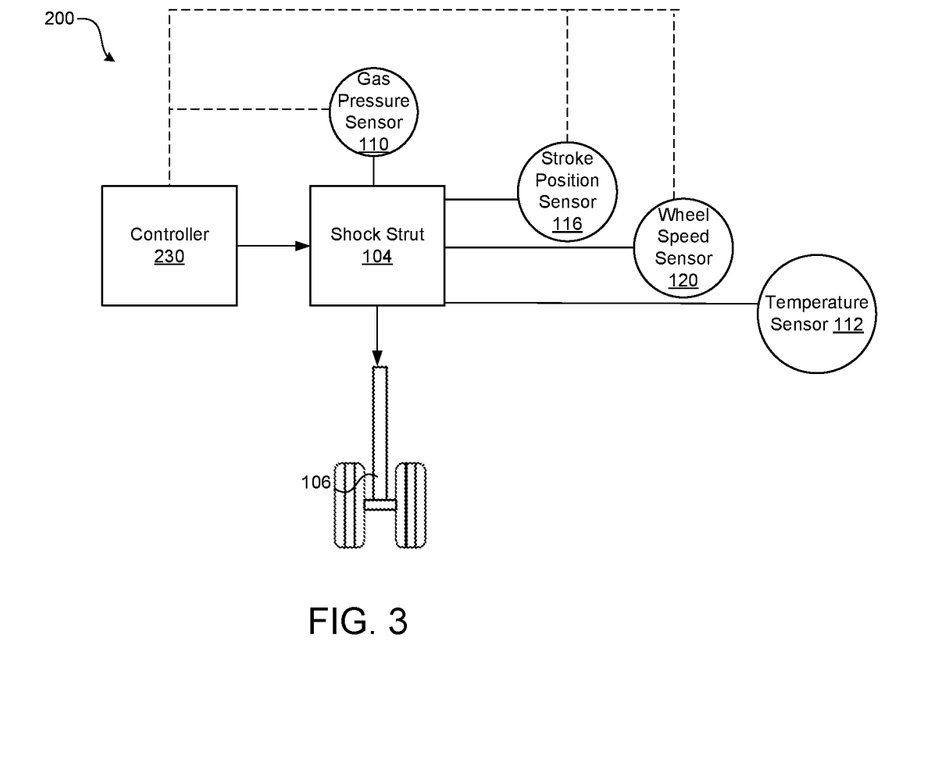
FIG. 3 illustrates a schematic of a hard-landing detection system, in accordance with various embodiments.

In various embodiments, and with reference to FIG. 3, a hard-landing detection system 200 is disclosed. The hard-landing detection system 200 may include the wheel assembly 106 and the shock strut 104 mentioned above. Additionally, the hard-landing detection system 200 may include a controller 230 configured to detect a landing event and determine if the landing event is "hard." As used throughout the present disclosure, the modifier "hard" refers to a landing event that, due to the force/impact of the landing, benefits from a structural inspection thereafter. As described in greater detail below, the controller 230 may be integrated into computer systems onboard aircraft such as, for example, a landing control unit, a full authority digital engine control (FADEC), an engine-indicating and crew-alerting system (EICAS), and/or the like. In various embodiments, the controller 230 may be a standalone computer system. The controller 230 may or may not be in electronic communication with one or more of the aircraft control systems, as described in further detail herein. The hard-landing detection system 200 may include one or more processors and/or one or more tangible, non-transitory memories capable of implementing logic. The processor and/or the memory may be components of the controller 230, or may be components of other control units that are in electronic communication with the controller 230.

The processor(s) can be a general purpose processor, a digital signal processor (DSP), an application specific integrated circuit (ASIC), a field programmable gate array (FPGA) or other programmable logic device, discrete gate or transistor logic, discrete hardware components, or any combination thereof. In various embodiments, the processor can be configured to implement various logical operations in response to execution of instructions, for example, instructions stored on a tangible, non-transitory memory or computer-readable medium. As used herein, the term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in *In Re Nuijten* to fall outside the scope of patentable subject matter under 35 U.S.C. § 101.

As mentioned above and with reference to FIGS. 2 and 3, the hard-landing detection system 200 may include, and the shock strut 104 may be coupled to, the gas pressure sensor 110, a wheel speed sensor 120, and/or a stroke sensor (e.g., a stroke position sensor) 116. In various embodiments, the hard-landing detection system 200 may also include a temperature sensor 112 and/or the gas pressure sensor 110 may be an integrated pressure/temperature sensor. In various embodiments, the temperature sensor 112 may be an independent temp sensor placed in the vicinity of landing gear shock strut, a temperature sensor placed on the body of the shock strut, a sensor measuring oil temperature, a sensor measuring gas temperature or an integrated pressure/temp sensor measuring gas temp and pressure simultaneously, in accordance with various embodiments. In various embodiments, a temperature measurement from temperature sensor 112 may be used to determine pressure or correct for pressure at a specific temperature used as a default for threshold determinations. In various embodiments, the gas pressure sensor 110 is configured to measure the pressure of the gas within the gas chamber of the shock strut 104 at a desired time. For example, the gas pressure sensor 110 may measure the gas pressure within shock strut 104 before, during, or after take-off, or at any point during the duty cycle of shock strut 104. In various embodiments, stroke position sensor 116 is configured to measure the position of piston 102 relative to cylinder 108, which is conventionally referred to as the stroke (referred to herein as a stroke profile) of shock strut 104. In various embodiments, the stroke position sensor 116 continuously measures the position of piston 102 relative to cylinder 108. The stroke position sensor 116 may be configured to measure the position indirectly, for example, by measuring the orientation of one or more shock strut torque links 118. Position sensor 116 may also measure the stroke of shock strut 104 at any point during the duty cycle of shock strut 104. In various embodiments, the wheel speed sensor 120 is configured to measure a speed of the wheel (e.g., an angular speed or a linear speed).

The shock strut 104 may include and/or may be coupled to various other components, such as a gas temperature sensor 112, an oil pressure sensor 114, and an oil temperature sensor (not shown). FIG. 2 illustrates various locations where such sensors (e.g., the gas temperature sensor 112 and/or the oil pressure sensor 114) may be coupled to the shock strut 104. In various embodiments, at least one of the gas temperature sensor 112, the oil pressure sensor 114, or the oil temperature sensor may be present, and in various embodiments, various combinations of the same are present.

In various embodiments, the hard-landing detection system 200 is configured to perform, by the processor/controller 230, various operations. Such operations include, according to various embodiments, detecting, by the process, a landing event. The operations may further include determining, by the processor, whether the landing event is "hard." In various embodiments, detecting the landing event includes using the stroke position sensor 116 to measure a stroke profile S(t) of the shock strut 104. That is, the stroke position sensor 116 may be configured to measure the shock strut stroke as a function of time. In various embodiments, determining whether the landing event is hard includes comparing the stroke profile S(t) with a predetermined maximum shock strut stroke. The predetermined maximum shock strut stroke may be the maximum relative displacement between of the piston 102 and the cylinder 108 (i.e., "bottoming" the shock strut 104). The landing event may be determined to be "hard" (thus triggering, for example, a structural inspection to be performed on the aircraft) if stroke profile meets or exceeds the predetermined maximum shock strut stroke.

In various embodiments, measuring the stroke profile S(t) of the shock strut 104 is performed at a predetermined frequency. For example, the predetermined frequency may be at least 10 hertz. In various embodiments, measuring the stroke profile of the shock strut 104 is performed at a frequency of at least 50 Hertz. In various embodiments, measuring the stroke profile of the shock strut 104 is performed at a frequency of at least 100 Hertz. In various embodiments, as described in greater detail below, the stroke profile S(t) can be differentiated to determine the compression rate profile $\dot{S}(t)$ of the shock strut 104, which can be used to calculate the oil pressure in the oil chamber $P_0(t)$.

In various embodiments, determining whether the landing event is hard includes calculating, by the processor, an oil pressure $P_0(t)$ in the oil chamber of the shock strut 104 based on the stroke profile S(t) and the measured gas pressure $P_g(t)$ (i.e., the pressure of the gas in the gas chamber using the gas pressure sensor 110). For example, the following equation (hereinafter "Eq.") (1) may be used by the processor to calculate the oil pressure $P_0(t)$:

$$P_o(t) = \left(\frac{(A_{p,i} - A_m(S(t))) \times \dot{S}(t)}{(A_o - A_m(S(t))) \times C_{d,0}}\right)^2 + P_g(t) \qquad \text{Eq. (1)}$$

wherein:
$A_{p,i}$ is the shock strut piston internal area,
$A_0$ is the shock strut orifice area,
$A_m$ is the metering pin cross-section area, and
$C_{d,0}$ is the orifice discharge coefficient, all of which are geometrical parameters of the shock strut 104.

In various embodiments, determining whether the landing event is hard further includes calculating, by the processor, a recoil pressure $P_{rc}(t)$ in the recoil chamber of the shock strut 104 based on the stroke profile S(t) and the measured gas pressure $P_g(t)$ (i.e., the pressure of the gas in the gas chamber using the gas pressure sensor 110). For example, Eq. (2) (below) may be used by the processor to calculate the recoil pressure $P_{rc}(t)$:

$$P_{rc}(t) = -\left(\frac{(A_{cyl} - A_{p,o}) \times \dot{S}(t)}{A_{o,rc} \times C_{d,rc,comp}}\right)^2 + P_g(t) \qquad \text{Eq. (2)}$$

wherein:
$A_{p,o}$ is the shock strut piston external area
$A_{cyl}$ is the cylinder internal area,
$A_{o,rc}$ is the recoil surface area, and
$C_{d,rc,comp}$ is the recoil orifice discharge coefficient during shock strut compression,
all of which are geometrical parameters of the shock strut 104.

In various embodiments, determining whether the landing event is hard still further includes calculating, by the processor, a vertical load $F_v(t)$ on the landing gear structure based on the stroke profile S(t), the gas pressure $P_g(t)$, the oil pressure $P_0(t)$ calculated in Eq. (1), and the recoil pressure $P_{rc}(t)$ calculated in Eq. (2). For example, Eq. (3) (below) may be used by the processor to calculate the vertical load $F_v(t)$ on the landing gear structure:

$$F_v(t) = P_g(t) \times (A_{cyl} - A_{p,i} + A_m(S(t))) + P_o(t) \times (A_{p,i} - A_m(S(t))) - P_{rc}(t) \times (A_{cyl} - A_{p,o}) + F_f \qquad \text{Eq. (3)}$$

wherein:
$F_f$ is the estimated friction force applied on the shock strut, and

In various embodiments, the vertical load $F_v(t)$ on the landing gear structure calculated from Eq. (3) is compared, by the processor, with a predetermined maximum vertical load to determine if the landing event is hard. That is, the landing event may be determined to be hard (thus triggering, for example, a structural inspection to be performed on the aircraft) if the vertical load $F_v(t)$ exceeds the predetermined maximum vertical load.

In various embodiments, determining whether the landing event is hard includes calculating, by the processor, a tire deflection profile $\Delta S_{tire}(t)$ based on the vertical load $F_v(t)$. The calculation of the tire deflection profile $\Delta S_{tire}(t)$ may be iterative. For example, Eq. (4) (below) may be used by the processor to calculate the tire deflection profile $\Delta S_{tire}(t)$:

$$\Delta S_{tire}(t) = \frac{F_v(f)}{K(\Delta S_{tire}(t))} \qquad \text{Eq. (4)}$$

wherein $K(\Delta S_{tire}(t))$ is the tire stiffness.

In various embodiments, determining whether the landing event is hard includes calculating, by the processor, a sink-rate of the landing gear assembly $\dot{S}_{landing\ gear}(t)$ based on the tire deflection profile $\Delta S_{tire}(t)$ and the stroke profile S(t). Calculating the sink-rate of the landing gear assembly $\dot{S}_{landing\ gear}(t)$ may include adding the tire deflection profile $\Delta S_{tire}(t)$ to the shock strut profile S(t), as shown below in Eq. (5), and then differentiating the result of Eq. (5), as shown in Eq. (6):

$$S_{landing\ gear}(t) = \Delta S_{tire}(t) + S(t) \quad \text{Eq. (5)}$$

$$\text{Sink-rate: } \dot{S}_{landing\ gear}(t) = \Delta \dot{S}_{tire}(t) + \dot{S}(t) \quad \text{Eq. (6)}$$

With the sink-rate of the landing gear assembly $\dot{S}_{landing\ gear}(t)$ calculated, the processor may compare the sink-rate of the landing gear assembly $\dot{S}_{landing\ gear}(t)$ to a predetermined maximum sink-rate (e.g., 10 feet per second). That is, the landing event may be determined to be hard (thus triggering, for example, a structural inspection to be performed on the aircraft) if the sink-rate of the landing gear assembly $\dot{S}_{landing\ gear}(t)$ exceeds the predetermined maximum sink-rate.

In various embodiments, the determining whether the landing event is hard includes calculating, by the processor, a pressure gradient $\Delta P(t)$ across an orifice support tube of the shock strut 104 based on the measured gas pressure $P_g(t)$ and the calculated oil pressure $P_o(t)$ (e.g., as calculated in Eq. (1)). For example, Eq. (7) (below) may be used by the processor to calculate the pressure gradient $\Delta P(t)$ across the orifice support tube of the shock strut 104:

$$\Delta P(t) = P_o(t) - P_g(t) \quad \text{Eq. (7)}$$

With the pressure gradient $\Delta P(t)$ across the orifice support tube calculated, the processor may compare the pressure gradient $\Delta P(t)$ across the orifice support tube to a predetermined pressure gradient limit. That is, the landing event may be determined to be hard if the pressure gradient $\Delta P(t)$ across the orifice support tube exceeds the predetermined pressure gradient limit.

In various embodiments, the determining whether the landing event is hard includes calculating, by the processor, a torque applied $T_{applied}$ to a tire of wheel assembly 106 assuming no bearing friction based on the measured speed of the tire $\omega_{tire}$. In particular, a rate of change of the measure speed of the tire $\dot{\omega}_{tire}$ is calculated as a function of time to determine an acceleration of the tire $\dot{\omega}_{tire}(t)$, an inertia of the rotating mass $I_{wbt}$ is known, and an unloaded tire radius $R_{unloaded}$ is known. For example, Eq. (8) (below) may be used by the processor to calculate the torque applied $T_{applied}$ to the tire of wheel assembly 106 assuming no bearing friction:

$$T_{applied}(t) = \frac{\dot{\omega}_{tire}(t)}{R_{unloaded}} \quad \text{Eq. (8)}$$

In various embodiments, the determining whether the landing event is hard includes calculating, by the processor, a total torque $T_{total}$ applied to the tire of wheel assembly 106 assuming bearing friction based on the calculated torque applied $T_{applied}$ to the tire of wheel assembly 106 assuming no bearing friction based on Eq. (8), the calculated vertical load $F_v(t)$ on the landing gear structure calculated from Eq. (3), and a bearing friction coefficient $\mu_{bearing}$. For example, Eq. (9) (below) may be used by the processor to calculate the total torque $T_{Total}$ applied to the tire of wheel assembly 106 assuming bearing friction:

$$T_{total}(t) = T_{applied}(t) + F_v(t)\mu_{bearing} \quad \text{Eq. (9)}$$

In various embodiments, the determining whether the landing event is hard includes calculating, by the processor, a tire drag load $F_{d_{tire}}$ based on the calculated total torque $T_{total}$ applied to the tire of wheel assembly 106 assuming bearing friction calculated from Eq. (9) and an unloaded tire radius $R_{unloaded}$. For example, Eq. (10) may be used by the processor to calculate the tire drag load $F_{d_{tire}}$:

$$F_{d_{tire}}(t) = \frac{T_{total}}{R_{unloaded}} \quad \text{Eq. (10)}$$

$$F_{d_{tire}}(t) = \quad \text{Eq. (11)}$$
$$m_{unsprung}\ddot{x}(t) + 2C_{damp}\sqrt{\frac{k_{drag}(t)m_{unsprung}}{g}}\dot{x}(t) + k_{drag}(t)x(t)$$

wherein:
$m_{unsprung}$ is the unsprung mass of the tire;
$C_{damp}$ is the axle damping coefficient;
$k_{drag}(t)$ is the axle for/aft stiffness;
$x(t)$ is the axle fore/aft displacement.

In various embodiments, the determining whether the landing event is hard includes calculating, by the processor, based on the aforementioned equations, an axle drag load as a function time $F_{d_{tire}}(t)$:

$$F_{d_{axle}}(t) = 2C_{damp}\sqrt{\frac{k_{drag}(t)m_{unspring}}{g}}\dot{x}(t) + k_{drag}(t)x(t) \quad \text{Eq. (12)}$$

In various embodiments, the hard-landing detection system 200 performs various operations, including measuring, by the processor and via the stroke position sensor 116, a stroke profile S(t) of the shock strut 104 to detect a landing event, and measuring via the wheel speed sensor 120, the angular velocity of the wheel and converting it to a linear velocity of the wheel $\dot{\omega}_{tire}$. The hard-landing detection system 200 may further include calculating, by the processor, multiple time dependent functions based on the stroke profile S(t) of the stock strut and based on the measured gas pressure $P_g(t)$, and based on the wheel speed $\dot{\omega}_{tire}(t)$. For example, the multiple time dependent functions may include the vertical load $F_v(t)$, the sink-rate of the landing gear assembly $\dot{S}_{landing\ gear}(t)$ across the orifice support tube, and the axle drag load $F_{d_{axle}}(t)$. In various embodiments, one or more of these time dependent functions, together with the stroke profile S(t) and the wheel speed $\omega_{tire}(t)$, can be compared to respective predetermined thresholds to determine whether the landing event is hard. That is, the hard-landing detection system 200 may include one or more multiple comparison tests for determining whether the landing is hard, thereby improving the robustness, accuracy, and scope of the hard-landing detection system.

In various embodiments, by including the wheel speed sensor 120 and deriving the axle drag load $F_{d_{axle}}(t)$, a margin of safety for determining a hard landing may be reduced. In this regard, the axle drag load may be estimated based on derived data, as opposed to applying a worst case estimate based on a vertical load, sink-rate, and pressure gradient.

In various embodiments, the axle drag load for a respective landing may be compared to a predetermined maximum drag load (i.e., a spin up drag load) and a predetermined minimum drag load (i.e., a spring back load, which is a maximum drag load in the opposite direction). Similarly, a vertical load for a respective landing may be compared to a maximum vertical load threshold. In various embodiments, the maximum vertical threshold may be less than a typical maximum vertical load threshold because the maximum vertical load threshold will not have to account for worst case maximum axle drag loads. Thus, the hard landing system 200, as described herein may be more robust relative to typical hard landing detection systems.

In various embodiments, the various sensors described herein (e.g., the stroke position sensor and the gas pressure sensor, among others) and the various systems and methods may be adapted and utilized to determine the service-status of the shock strut 104. For example, the components and methods described herein may be utilized to monitor the servicing status of the shock strut 104. That is, in addition to determining a hard-landing event, the system disclosed herein may also be used to identify improperly serviced or under-serviced shock struts (e.g., a shock strut may have insufficient oil or gas). The determination of the servicing status of the shock strut 104 may influence the determination of whether a landing event was hard, and vice-versa.

In various embodiments, the hard-landing detection system 200 detects whether the landing event is hard for individual shock struts, or at least for individual landing gear assemblies. That is, hard-landing detection system 200 may report that one of the landing gear assemblies of the aircraft experienced a hard landing event, while other landing gear assemblies of the aircraft did not. Accordingly, the data detected and/or calculated and determination of whether a landing was hard may be independently executed and thus may be specific to individual landing gear of the aircraft. In various embodiments, the data detected and/or calculated may be immediately analyzed or such data/information may be stored for subsequent analysis. Such data and determinations may be analyzed to determine other details or circumstances of the hard-landing event, such as whether the landing event was an asymmetric main landing gear landing or whether the nose of the aircraft experienced hard de-rotation, among others.

Figure 4:
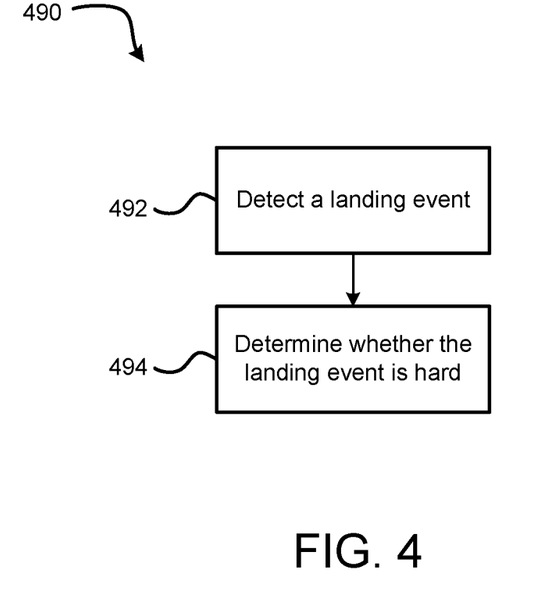
FIG. 4 is a schematic flow chart diagram of a method of controlling a hard-landing detection system, in accordance with various embodiments.

Also disclosed herein, according to various embodiments and with reference to FIG. 4, is a method 490 for controlling the hard-landing detection system 200. The method 490 includes, according to various embodiments, detecting, by a controller, a landing event at step 492 and, in response to detecting the landing event at step 492, determining, by the controller, whether the landing event is hard at step 494.

Figure 5:
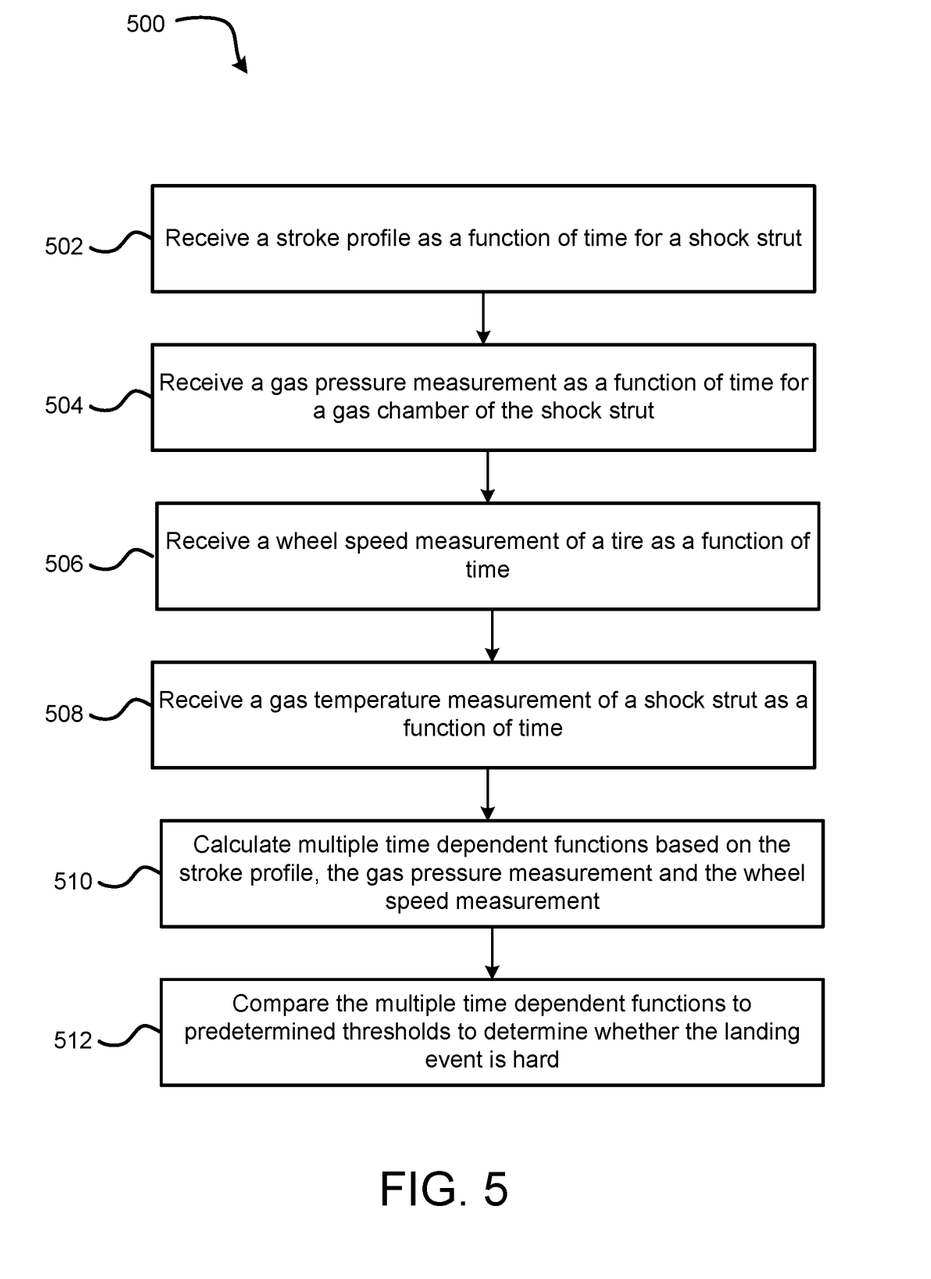
FIG. 5 is a method of determining whether a landing is hard, in accordance with various embodiments.
Figure 6:
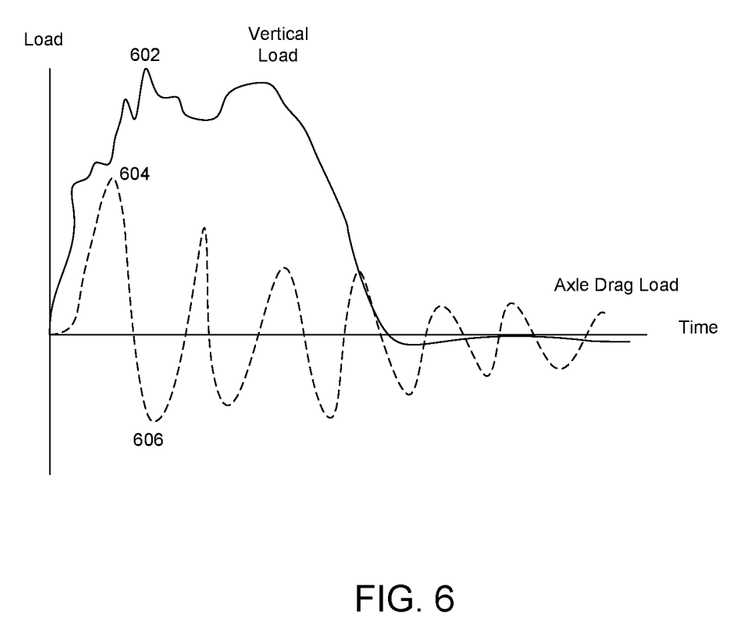
FIG. 6 illustrates a plot of various loads as a function of time during an aircraft landing event, in accordance with various embodiments.

Referring now to FIG. 5, a method 500 of determining whether a landing event is hard is illustrated, in accordance with various embodiments. The method 500 may comprise receiving, by a controller via a stroke position sensor (e.g., position sensor 116 from FIG. 3), a stroke profile as a function of time for a shock strut (step 502), receiving, by the controller via a gas pressure sensor (e.g., gas pressure sensor 110 from FIG. 3), a gas pressure measurement in a gas chamber of the shock strut as a function of time (step 504), receiving, by the controller via a wheel speed sensor (e.g., wheel speed sensor 120 from FIG. 3), a wheel speed of a tire in a landing gear assembly (step 506), and receiving, by the controller via a temperature sensor (e.g., temperature sensor 112 from FIG. 3), a gas temperature in a landing gear assembly (step 508). In response to receiving these measurements, the controller may calculate multiple time dependent functions to determine a vertical load as a function of time and an axle drag load as a function of time (step 510). In various embodiments, the axle drag load as a function of time may represent damped oscillations with a largest absolute load experienced during spin up (e.g., a largest positive load, such as point 604 in FIG. 6) or during spring back (e.g., a largest negative load, such as point 606 in FIG. 6). In various embodiments, the vertical load may be greatest (e.g., point 602 in FIG. 6) between spin up (e.g., point 604 in FIG. 6) or during spring back (e.g., point 606 in FIG. 6).

Figure 7:
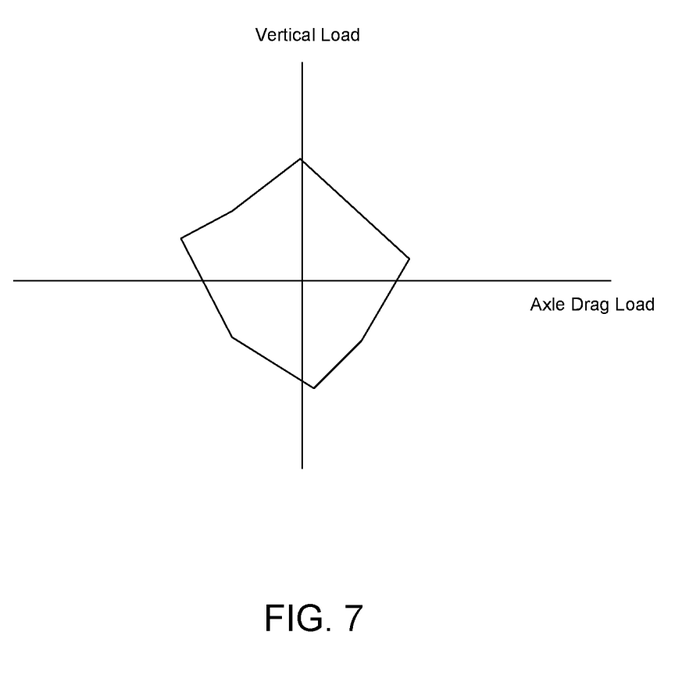
FIG. 7 illustrates a plot having a predetermined envelope for axle drag loads and vertical loads, in accordance with various embodiments.

In various embodiments, the method 500 may further comprise comparing, by the controller, the multiple time dependent functions to respective predetermined envelope for the axle drag load and/or the vertical load (step 512). For example, the controller may be configured to compare the axle drag load and the vertical load to an acceptable envelope for axle drag load and vertical load, in accordance with various embodiments. With brief reference to FIG. 7, an exemplary predetermined envelope for the axle drag load and the vertical load is illustrated, in accordance with various embodiments.

The systems and methods described herein may be applicable to various shock strut configurations. For example, the systems and methods described herein may be implemented in single or multiple (e.g., dual) stage strut configurations.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Also, any reference to attached, fixed, connected, coupled or the like may include permanent (e.g., integral), removable, temporary, partial, full, and/or any other possible attachment option. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A hard-landing detection system of an aircraft, the hard-landing detection system comprising:
   a landing gear assembly comprising:
      a wheel assembly having a wheel,
      a shock strut mechanically coupled to the wheel assembly,
      a stroke position sensor coupled to the shock strut,
      a gas pressure sensor coupled to the shock strut,
      a wheel speed sensor configured to determine a wheel speed of the wheel;
      a temperature sensor configured to determine a temperature of the shock strut;
   a controller having a processor; and
   a tangible, non-transitory memory configured to communicate with the processor, the tangible, non-transitory memory having instructions stored thereon that, in response to execution by the processor, cause the hard-landing detection system to perform operations comprising:
      detecting, by the processor, a landing event;
      performing, by the processor, calculations based on time dependent measurements, the time dependent measurements comprising a stroke profile of the shock strut from the stroke position sensor, a gas pressure from the gas pressure sensor, and the wheel speed from the wheel speed sensor, wherein the performing the calculations includes deriving a maximum axle drag load at least partially from the wheel speed;
      comparing, by the processor, a maximum vertical load, the maximum axle drag load, and a minimum axle drag load to predetermined envelope for vertical loads and axle drag loads; and
      in response to at least one of the maximum vertical load, the maximum axle drag load, and the minimum axle drag load being outside the predetermined envelope for vertical loads and axle drag loads, determining, by the processor, the landing event is hard.

2. The hard-landing detection system of claim 1, wherein detecting the landing event comprises using the wheel speed sensor to measure an applied torque to a tire.

3. The hard-landing detection system of claim 1, wherein determining whether the landing event is hard comprises comparing, by the processor, an axle drag load to a predetermined maximum axle drag load for a corresponding vertical load.

4. The hard-landing detection system of claim 1, wherein determining whether the landing event is hard comprises:
   calculating, by the processor, an applied torque based on an acceleration of the wheel, an inertia of a rotating mass, and an unloaded tire radius;
   calculating, by the processor, a total torque based on the applied torque, a shock strut vertical load, and a bearing friction coefficient;
   calculating, by the processor, a tire drag force based on the total torque and a loaded tire radius;
   calculating, by the processor an axle drag force based on the tire drag force; and
   comparing, by the processor, the axle drag force to a predetermined maximum axle drag load for a corresponding vertical load.

5. The hard-landing detection system of claim 4, wherein the operations further comprise comparing, by the processor, the axle drag force to a predetermined minimum axle drag load.

6. The hard-landing detection system of claim 4, wherein determining whether the landing event is hard further comprises:
   calculating, by the processor, a vertical load on a landing gear structure based on the stroke profile, the gas pressure, an oil pressure, and a recoil pressure; and
   comparing, by the processor, the vertical load to a predetermined maximum vertical load.

7. The hard-landing detection system of claim 6, wherein determining whether the landing event is hard further comprises determining, by the processor, the landing event is hard in response to one of the following being true:
   the vertical load exceeding the predetermined maximum vertical load for a corresponding axle drag load;
   the axle drag force exceeding the predetermined maximum axle drag load for a first corresponding vertical load; or the axle drag force being below a predetermined minimum axle drag load for a second corresponding vertical load.

8. A method of determining whether a landing event of an aircraft is hard, the method comprising:
receiving, by a controller via a stroke position sensor, a stroke profile as a function of time for a shock strut;
receiving, by the controller via a gas pressure sensor, a gas pressure in a gas chamber of the shock strut;
receiving, by the controller via a wheel speed sensor, a wheel speed of a tire in a landing gear assembly;
receiving, by the controller via a temperature sensor, one of a gas temperature, an oil temperature, or a shock strut temperature of the shock strut in the landing gear assembly;
calculating, by the controller, multiple time dependent functions based on the stroke profile of the shock strut, based on the gas pressure, and based on the wheel speed, wherein the calculating includes deriving a maximum axle drag load in the multiple time dependent functions at least partially from the wheel speed;
comparing, by the controller, the multiple time dependent functions to a respective predetermined envelope for axle drag loads and vertical loads to determine whether the landing event is hard; and
in response to at least one of the multiple dependent functions is outside the predetermined envelope for vertical loads and axle drag loads, determining the landing event is hard.

9. The method of claim 8, further comprising comparing, by the controller, an axle drag load to a predetermined maximum axle drag load for a first corresponding vertical load.

10. The method of claim 9, further comprising comparing, by the controller, an axle drag load to a predetermined minimum axle drag load for a second corresponding vertical load.

11. The method of claim 10, further comprising comparing, by the controller, a vertical load of a landing gear structure to a predetermined maximum vertical load for a corresponding axle drag load.

12. The method of claim 11, further comprising determining, by the controller, the landing event is hard in response to one of the vertical load exceeding the predetermined maximum vertical load for the corresponding axle drag load, the axle drag load exceeding the predetermined maximum axle drag load for the first corresponding vertical load, or the axle drag load being less than the predetermined minimum axle drag load for the second corresponding vertical load.

13. The method of claim 8, further comprising:
calculating, by the controller, an applied torque based on an acceleration of the tire, an inertia of a rotating mass, and an unloaded tire radius;
calculating, by the controller, a total torque based on the applied torque, a shock strut vertical load, and a bearing friction coefficient;
calculating, by the controller, a tire drag force based on the total torque and a loaded tire radius;
calculating, by the controller, a vertical load on a landing gear structure based on the stroke profile, the gas pressure, and the gas temperature;
calculating, by the controller an axle drag force based on the tire drag force; and
comparing, by the controller, the axle drag force and the vertical load to a predetermined envelope of axle drag loads and vertical loads.

14. The method of claim 13, further comprising comparing, by the controller, the axle drag force to a predetermined minimum axle drag load.

15. An article of manufacture including a tangible, non-transitory computer-readable storage medium having instructions stored thereon that, in response to execution by a processor, cause the processor to perform operations comprising:
receiving, via the processor, a stroke profile as a function of time for a shock strut;
receiving, via the processor, a gas pressure measurement in a gas chamber of the shock strut;
receiving, via the processor, a wheel speed measurement of a tire in a landing gear assembly;
receiving, via the processor, a gas temperature measurement of the shock strut;
calculating, by the processor, a vertical load on a landing gear structure based on the stroke profile, the gas pressure measurement, and the gas temperature measurement;
calculating, via the processor, an axle drag load as a function of time based on the stroke profile of the shock strut, based on the gas pressure measurement, and based on the wheel speed measurement, wherein the calculating includes deriving the axle drag load as a function of time at least partially from the wheel speed measurement;
comparing, via the processor, the axle drag load as a function of time and the vertical load as a function of time to a predetermined envelope of axle drag loads and vertical loads to determine whether a landing event is hard; and
in response to at least one of the axle drag load and the vertical load is outside the predetermined envelope of axle drag loads and vertical loads, determining the landing event is hard.

16. The article of manufacture of claim 15, wherein the operations further comprise comparing, via the processor, the axle drag load as a function of time to a predetermined axle drag load minimum threshold to determine whether the landing event is hard.

17. The article of manufacture of claim 16, wherein the operations further comprise determining, via the processor, the landing event is hard in response to one of the axle drag load exceeding a predetermined axle drag load maximum threshold for a first corresponding vertical load and the axle drag load being less than the predetermined axle drag load minimum threshold for a second corresponding vertical load.

18. The article of manufacture of claim 15, wherein the operations further comprise:
calculating, via the processor, an applied torque based on an acceleration of the tire, an inertia of a rotating mass, and an unloaded tire radius;
calculating, via the processor, a total torque based on the applied torque, a shock strut vertical load, and a bearing friction coefficient;
calculating, via the processor, a tire drag force based on the total torque and a loaded tire radius;
calculating, via the processor an axle drag force based on the tire drag force; and
comparing, via the processor, the axle drag force to a predetermined maximum axle drag load.

19. The article of manufacture of claim 18, wherein the operations further comprise comparing, by the processor, the axle drag force to a predetermined minimum axle drag load.

20. The article of manufacture of claim 19, wherein the operations further comprise:
- calculating, by the processor, the vertical load on the landing gear structure based on the stroke profile, a gas pressure, an oil pressure, a gas temperature, and a recoil pressure; and
- comparing, by the processor, the vertical load to a predetermined maximum vertical load for a corresponding axle drag load.

* * * * *